United States Patent

[11] 3,580,077

| [72] | Inventor | Seymour N. Blackman<br>3 Horizon Road, Penthouse #4, Fort Lee, N.J. 07024 |
|---|---|---|
| [21] | Appl. No. | 776,363 |
| [22] | Filed | Nov. 18, 1968 |
| [45] | Patented | May 25, 1971 |

[54] CLINICAL THERMOMETER STORAGE AND STERILIZING APPARATUS
10 Claims, 10 Drawing Figs.

[52] U.S. Cl. ................................................ 73/343,
21/90, 73/374, 248/313
[51] Int. Cl. ..................................................... G01k 1/00,
G01k 1/14, A61l 3/00
[50] Field of Search .......................................... 248/313;
206/16.6, 16.5; 73/371, 343, 374; 21/78, 83, 90

[56] References Cited
UNITED STATES PATENTS

| 304,896 | 9/1884 | Barry............................. | 73/371 |
| 2,015,505 | 9/1935 | Warshawsky.................. | 206/16.6 |
| 3,212,660 | 10/1965 | Adell............................. | 248/313 |
| 3,212,661 | 10/1965 | Adell............................. | 248/313 |
| 3,321,068 | 5/1967 | Beach............................ | 206/16.6 |

OTHER REFERENCES

The "Merk Index" Seventh Edition copyright 1960 page 863. Copy located in 8B24CP3 art unit 125.

Primary Examiner—Louis R. Prince
Assistant Examiner—Denis E. Corr
Attorney—Kirschstein, Kirschstein, Ottinger & Frank ABSTRACT: A thermometer storage container is cylindrically shaped and longitudinally ribbed along its outer surface. The ribs engage resilient gripping flanges on a wall bracket permitting the container to be snapped forwardly into the bracket and axially withdrawn therefrom. A drip proof cover engages a diaphragm at the upper end of the container and encases the upper portion of a thermometer which projects through the diaphragm. The lower portion of the thermometer within the container below the diaphragm is immersed in propylene glycol which functions as a cold-sterilizing solution and additionally acts as a lubricant for rectal insertion of the thermometer.

PATENTED MAY 25 1971

INVENTOR
SEYMOUR N. BLACKMAN

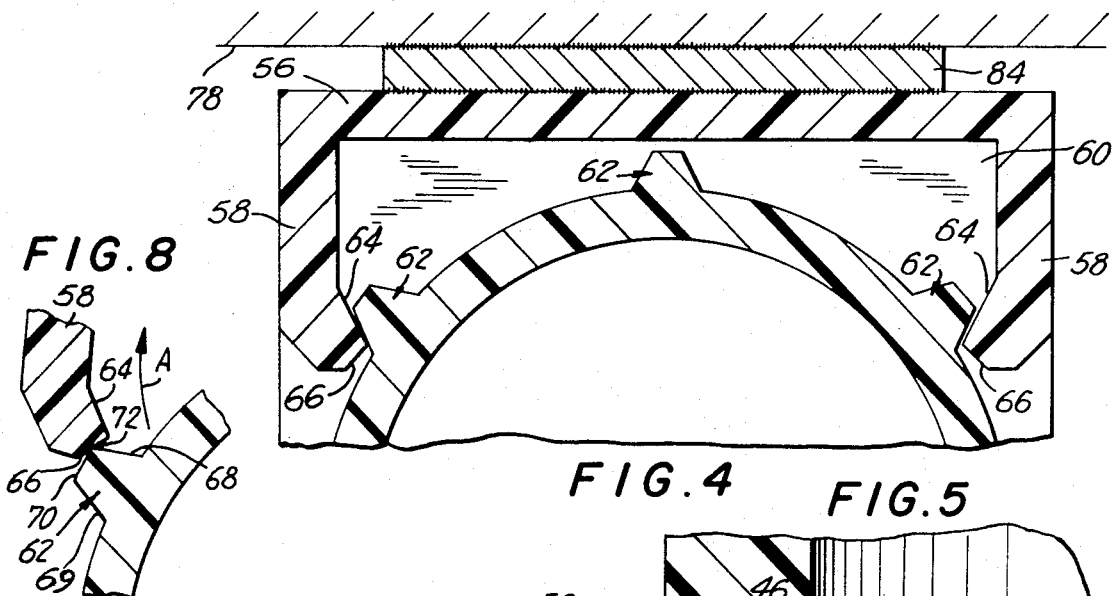
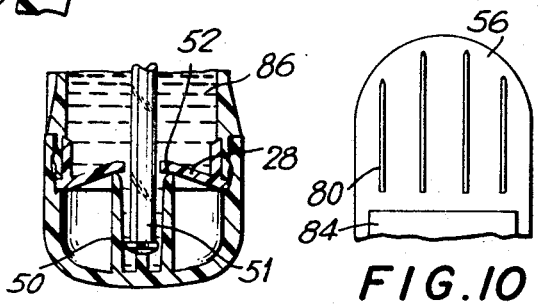
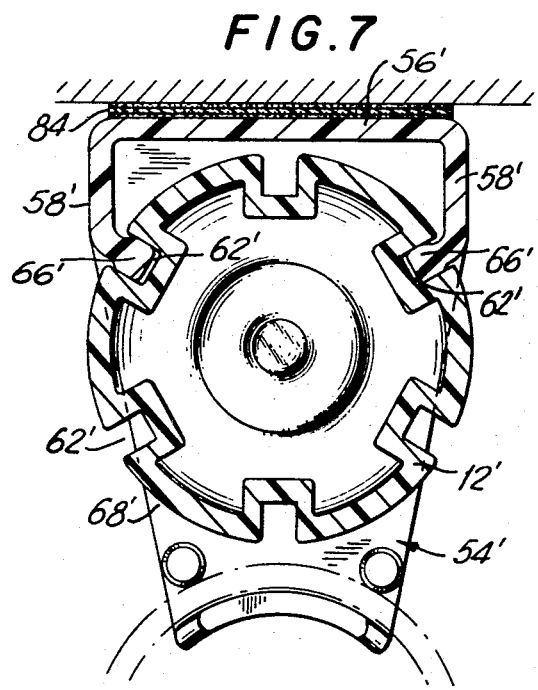
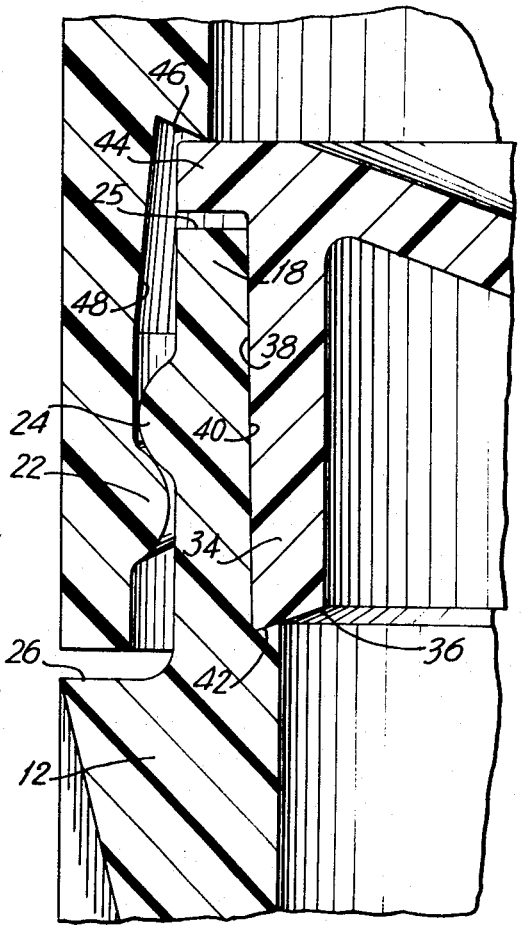
INVENTOR.
SEYMOUR N. BLACKMAN

CLINICAL THERMOMETER STORAGE AND STERILIZING APPARATUS

BACKGROUND OF THE INVENTION

1. Field of the Invention

Thermometer storage containers with cold-sterilizing solutions.

2. Description of the Prior Art

Many hospitals employ thermometer storage and sterilizing containers disengageably mounted on bedside walls. The container and thermometer are used by a nearby individual patient to whom the same usually are given at the termination of the patient's stay. These containers, however, are basically unattractive and have certain difficulties and disadvantages.

A primary disadvantage was that mounting to and dismounting from the wall bracket was a time-consuming operation.

Other difficulties encountered with the use of these prior devices arose from the fact that if the containers were inclined, overturned or dropped, spillage of the sterilizing liquid readily occurred. Additionally, even with the cover positioned on the container, overturning of the container usually resulted in leakage of the sterilizing liquid between the cover and the container.

A further disadvantage of prior devices was that when using a prior container having a removable cover, the nurse would have to find a place to put the cover when the thermometer was removed and the patient's temperature taken.

Cold solutions previously have been used for sterilizing clinical thermometers. But they all have required the separate application of a lubricant to facilitate insertion of the thermometer in a patient's rectum.

SUMMARY OF THE INVENTION

It is an object of the present invention to provide a thermometer container of the character described which is so constructed that it is not subject to any of the foregoing disadvantages.

More specifically, it is an object of the invention to provide a thermometer container of the character described which is simple and rugged in construction, yet can be fabricated by mass production methods at an appreciably lower cost than prior devices designed to serve the same functions.

It is a further object of the invention to provide a thermometer container and wall bracket wherein the thermometer container may be quickly and easily removed from and secured to a wall bracket.

Yet another object of the invention is to provide a thermometer container of the character described wherein the possibility of spillage of the cold-sterilizing solution is minimized.

A further object of the invention is to provide a thermometer container of the character described wherein a diaphragm engages a sealing portion of the container cap to minimize spillage of the sterilizing solution.

A further object of the invention is to provide a thermometer container of the character described wherein a diaphragm prevents excessive spillage of sterilizing solution when the container is overturned without a cover, yet readily permits removal and insertion of the thermometer into the sterilizing solution.

It is another object of the invention to provide a new and improved solution which acts as a cold-sterilizing medium and also as a rectal lubricant.

It is another object of the present invention to provide a new and improved method for preparing a thermometer for rectal insertion.

It is still another object of the present invention to provide a new and improved method of both sterilizing and lubricating a rectal thermometer.

Other objects of the invention in part will be obvious and in part will be pointed out hereinafter.

The invention accordingly consists in the features of construction, combinations of elements, arrangements of parts and series of steps which will be exemplified in the thermometer storage and sterilizing apparatuses and method hereinafter described, and of which the scope of application will be indicated in the appended claims.

BRIEF DESCRIPTION OF THE DRAWINGS

In the accompanying drawings in which are shown various possible embodiments of the invention:

FIG. 4 is an enlarged fragmentary cross-sectional view taken substantially along the line 4-4 of FIG. 2, and showing the engagement between the container ribs and the wall bracket;

FIG. 5 is an enlarged fragmentary longitudinal cross-sectional view taken substantially along the line 5-5 of FIG. 3 and showing in detail the interengagement between the container cap and the diaphragm;

FIG. 6 is a fragmentary axial cross-sectional view showing the container in inverted position and illustrating the manner in which the seal between the diaphragm and a well in the cap prevents filling of the cap with sterilizing solution which may lead to subsequent spillage;

FIG. 7 is an enlarged transverse cross-sectional view showing the interengagement between the wall bracket and the container of an alternate embodiment of the invention;

FIG. 8 is an enlarged fragmentary cross-sectional view showing the relative positions of a wall bracket flange and a container rib as the container is being snapped into engagement with the wall bracket;

FIG. 10 is a fragmentary view substantially taken along the line 10-10 of FIG. 3 and illustrating the rear face of the wall bracket.

DESCRIPTION OF THE PREFERRED EMBODIMENTS

Figure 1:
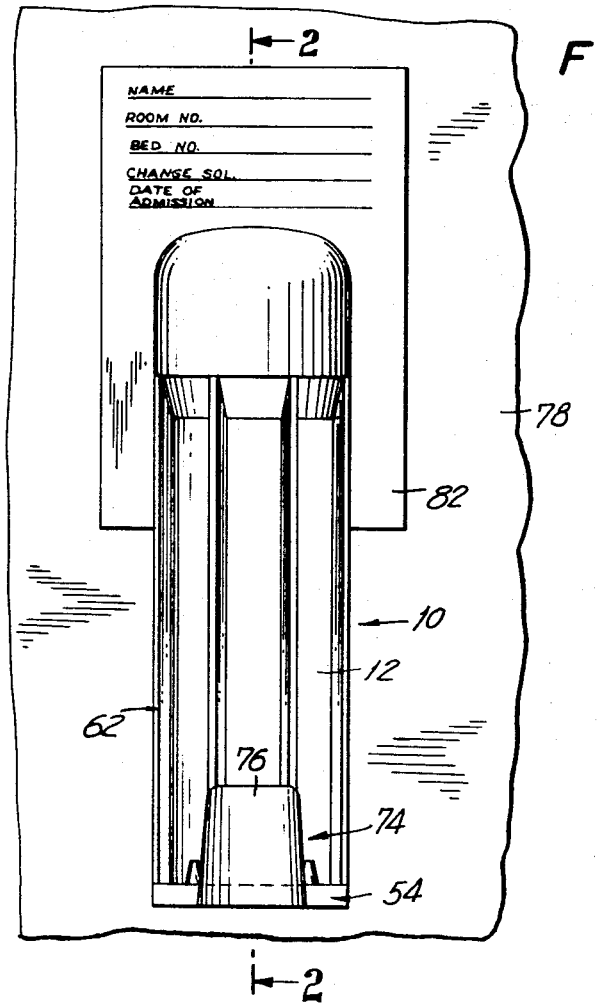
FIG. 1 is a front view of a thermometer storage container and bracket embodying the invention.
Figure 9:
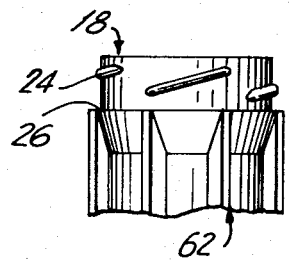
FIG. 9 is a fragmentary view of the top of the storage container with the cap removed.

In accordance with the present invention a cylindrical thermometer casing is provided for a hospital patient. A bracket is affixed to a bedside wall and flanges projecting from the bracket engage longitudinal ribs positioned along the periphery of the cylindrical casing, permitting the casing upon being pushed forwardly to be snapped into engagement with the bracket, and to be removed from the bracket by sliding the casing vertically upward. The body of the thermometer container is substantially filled with a cold-sterilizing solution and the upper open end of the container covered by a diaphragm having a central opening through which the thermometer is inserted. A cap threadably engages the top of the thermometer container and a downwardly projecting open-ended cylindrical portion of the cap constituting an inverted well encloses the portion of the thermometer that projects upwardly through the diaphragm. The edge of the open end of the cylindrical cap portion engages the diaphragm to form a liquidtight seal therewith that prevents leakage of sterilizing solution from the well if the container is inverted. A flange projecting from the base of the bracket is contoured to receive the container cap when the cap is off the container.

The rear face of the bracket is readily affixed to the wall by a double adhesive faced strip, and an identification card can be forced into the space between the rear face of the bracket and the bedside wall.

The sterilizing solution used with the storage container is propylene glycol with up to 50 percent by volume of water or ethanol. This solution serves to cold sterilize the thermometer and additionally lubricates the same sufficiently for insertion into a patient's rectum.

Referring now in detail to the drawings, the reference numeral 10 denotes a storage container constructed in accordance with and embodying the present invention, the components thereof preferably being made from a synthetic plastic, e.g. polypropylene or cellulose acetate butyrate. The storage container 10 includes a cylindrical housing 12 with a bottom wall 14 which is inset within the housing. The bottom wall 14 is downwardly conical in shape with the apex of the cone at the center of the bottom wall. A thermometer 15 placed in the housing will have its bulb end automatically guided to a central location at the apex 16 of the conical bottom wall 14. The opposite end of the cylindrical housing 12 has an open top 18. A cap 20 is detachably secured over the open top 18 by threaded engagement of an interrupted multiple female thread 22 on the cap with a matching interrupted multiple male thread 24 on the housing. A stepped shoulder 26 terminates the threaded end portion of the open top 18.

Positioned within and substantially covering the upper end 25 of the housing wall, is a diaphragm 28. The diaphragm is conically shaped (dished) in a fashion similar to the bottom wall 14 and includes a central opening 30 at its apex. The opening 30 is of sufficient size and proper shape to allow a standard clinical thermometer 15 to freely pass therethrough with a slight clearance, e.g. one-sixteenth of an inch, thereby accommodating clinical thermometers of slightly different transverse dimensions. Thus, the thermometer 15 may be thrust through the opening 30 and will be centrally located within the housing as its bulb rests on the apex 16 of the bottom wall 14.

A concentric skirt 34 is integrally formed with the diaphragm 28 and projects downwardly therefrom into the hollow housing 12. The bottom of said flange 34 is angularly shaped with a downwardly and outwardly sloping bottom surface 36 forming an annular sealing lowermost knife edge.

The outer face 38 of the skirt 34 is juxtaposed against a mating enlarged bore 40 within the hollow cylindrical housing 12 adjacent and running to the upper edge 25 thereof. At the base of the bore 40 an upwardly and inwardly sloping annular knife edge 42 mates with the sloping bottom surface 36 of the skirt 34 to present a liquidtight seal between the diaphragm and the housing when the diaphragm is pressed into the housing 12. The outer face 38 of the skirt 36 projects upwardly above the open top 18 of the housing to a peripheral flange 44 which extends radially outwardly from above the skirt. This flange 34 is spaced above the open end 25 of the cylindrical housing when the knife edge 36 of the skirt 34 abuts the mating knife edge 42 at the bottom of the bore 40. This space between the flange 44 and the open end 18 insures mutual engagement of the knife edges 36, 42 and sealing of the cap 20 against the diaphragm 28 when the cap is screwed home against the housing 12 and also functions as a yielding stop to limit downward turning movement of the cap as it is tightened on the housing.

To seal the cap 20 against the diaphragm 28 at the flange 44, an annular knife edge 46 is concentrically provided within the cap 20. This knife edge 46 slopes downwardly and inwardly toward the center of the cap with its lowermost edge disposed to engage the flange 44 when the cap is screwed down. A tapered recess 48 joins the upper end of the knife edge 46 with the inner periphery of the female threaded cap end.

With the parts assembled as illustrated in FIG. 5 it can be seen that the space between the underside of the flange 44 and the open top 18 is less than the space between the bottom of the cap and the shoulder 26. Thus, as the cap is screwed down, the flange 44 flexes, optionally until its undersurface abuts the upper end 26. Even at this point there is yet space between the bottom of the cap 20 and the shoulder 26 of the housing.

With the flange 44 bent until its undersurface abuts the wall end 25 a further seal between the diaphragm and the cap is effected. That is to say a sterilizing solution should not pass between the abutting knife edges 42 and 36 at the connection between the housing 12 and the skirt 34 when the cap is screwed tight. However even if some solution does pass this knife edge seal, due to a faulty molding, still the sterilizing solution will not pass the abutting seal between the underside of the flange 44 and the wall end 25.

With respect to any sterilizing solution that may find its way above the diaphragm 28, this solution will not be able to leak past the seal between the knife edge 46 of the cap 20 and the upper surface of the diaphragm flange 44 as long as the cap is screwed tight.

In order to prevent leakage of any sterilizing solution which passes through the space between a thermometer and the central opening 30 of the diaphragm 28 when the container is inverted, a tubular cylindrical formation 50 is integrally formed concentrically within the hollow cap 20 and projects downwardly, enclosing the central opening 30. This tubular formation 50 is of a diameter which is sufficiently large to enclose both the portion of the thermometer which projects above the diaphragm and the opening 30. It is also sufficiently large to accommodate the head 51 of the thermometer. The lower end of the formation 50 terminates in an annular knife edge 52 which abuts the conical diaphragm 28 concentrically around the opening 30. The formation 50 is of such length that abutting sealing contact between the knife edge 52 and the upper surface of the diaphragm 28 is made as the cap is screwed downwardly into its home position. The plastic of which the components of the container is made is sufficiently resilient to allow all the seals to be made regardless of slight variations in dimensions inherent in molding.

With the cap screwed tight on the open top 18, the thermometer container may be inclined, or even completely overturned as illustrated in FIG. 6. In this position sterilizing solution from the housing will flow into the cylindrical formation (well) but will be unable to pass between the knife edge 52 and the diaphragm 28; hence the volume of outflow is limited to the free space left in the well. With the container thereafter righted, the cap may be removed and there will be no spillage of sterilizing solution because any sterilizing solution entrapped in the formation 50 will flow on to the dish shaped diaphragm 28 and through its opening 30 into the housing. The capacity of the dish-shaped diaphragm exceeds that of the space in the well so there will be no overflow.

The portion of the thermometer projecting above the diaphragm 28 is completely encased in the formation 50 and the remainder of the thermometer is isolated in the sterilizing solution, with the thermometer bulb at the apex 16 of the bottom wall 14. A fairly shock resistant protection is thus provided which will guard the thermometer against accidental breakage.

It is a feature of the invention that the container 10 may be readily detached from, by upward movement, or pushed forwardly into snap engagement with a plastic wall bracket 54. The bracket 54 includes a vertical wall mounting plate 56. A stiff but resilient vertical gripping flange 58 projects perpendicularly forwardly from each side edge of the vertical plate 56 forming a U-shaped channel 60 that is open at its upper end. The tips of each flange 58 are inclined inwardly and forwardly.

The opposed tips of the gripping flanges 58 are spaced to snugly engage the remote side surfaces of equiangularly spaced ribs 62 which project radially outwardly from the periphery of the housing 12. The opposed edges 64 of the tips taper as illustrated in FIG. 4 to end faces 66.

The housing 12 may be snapped forwardly into the bracket 54 with the opposed flanges 58 snugly engaging the remote side surfaces of any two spaced ribs 62 of the housing in a manner to be hereinafter described. The two ribs thus engaged need not be immediately adjacent one another; indeed, as shown herein, the engaged ribs are on opposite sides of an intermediate rib. Because the ribs are spaced-apart uniformly, no particular ribs need be selected for the push-in fit.

To engage the housing with the bracket 54 one places the housing on the bottom 68 of the bracket 54. It is then slid along the bottom 68 toward the wall plate 56 and is simultaneously twisted in a clockwise direction as viewed in FIGS. 4 and 8. The housing will turn until a rib 62 which is shown on the far right in FIG. 4 abuts the sloping inner edge 64 of the tip of the right-hand flange 58 as viewed in FIG. 4. In this position with the rib and flange engaged, clockwise turning of the cylindrical housing will no longer rotate the housing about its center but will rotate the housing about said edge 64 and cause the flange 58 on the left as viewed in FIG. 4 to flex outwardly, permitting the left rib 62 to slide past its tip until it clears the same whereupon it will shift toward the back of the channel 60 and the left rib 62 will snap into position behind it as shown in FIG. 4.

FIG. 8 illustrates the manner in which the rib 62 of the housing 12 engages the end face 66 as the entire housing pivots about the edge 64 of the right flange 58 in the direction as shown by the arrow A. Referring specifically to FIG. 8, it may be seen that the rib 62 is trapezoidal in shape with sloping sidewalls 69 and a flat top 70. The forward corner 72 of the rib 62 abuts and slides along the end face 66 of the left flange 58 as the cylindrical housing 12 pivots. During this pivoting, the left flange will flex outwardly to aid in admitting the left rib 62.

Although the foregoing has been described as a clockwise movement, a counterclockwise movement can be equally well employed with the first engagement between the left-hand flange and rib and the final snap engagement between the right-hand flange and rib.

The described mode of push-twist-snap engagement is extremely rapid and simple to perform and does not require a delicate angular end-to-end alignment of the housing and bracket prior to sliding interengagement.

To remove the cylindrical container from the bracket 54 one need only lift the container vertically and the ribs 62 will slide out of engagement with the flanges 58.

Shown in FIG. 7 is an alternate embodiment of flange and rib construction. In this embodiment, the flanges 58' engage parallel spaced grooves positioned along the periphery of the housing 12'. The ends of the flanges 58' are inclined inwardly toward each other and terminate at enlarged head portions 66'.

To position the cylindrical housing of this embodiment within the bracket 54' one would similarly slide the cylindrical housing 12' along the base 68' of the bracket 54' and engage one of the spaced grooves 62' with one of the flange heads 66'.

Subsequent pivoting of the container 12' about the joint between flange head 66' and the groove 62' will cause the opposed flange 58' and its head 66' to flex somewhat permitting the container to move toward the rear plate 56'; the flexed flange 58' with its head 66' engages the associated groove 62' as it snaps to its original unflexed position.

Figure 2:
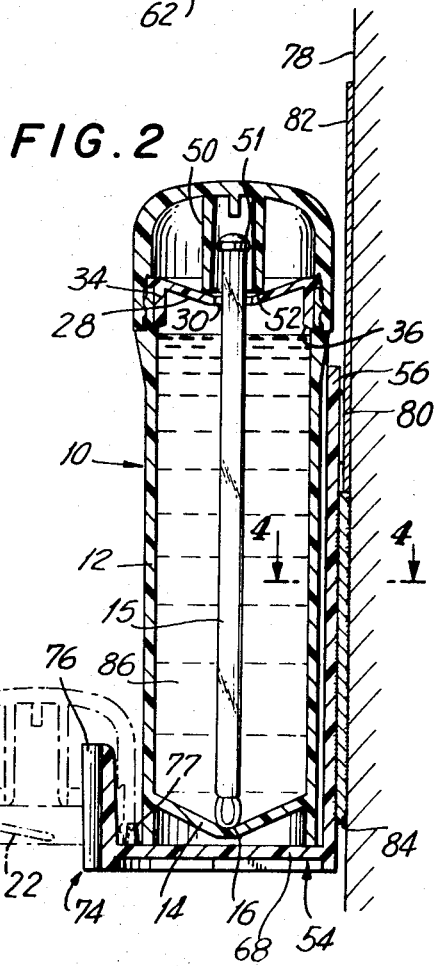
FIG. 2 is an axial cross-sectional view of the thermometer container and wall bracket, the same being taken substantially along the line 2-2 of FIG. 1 and showing, in dot-and-dash lines, the manner in which the container cap is held by the bracket after removal from the container.
Figure 3:
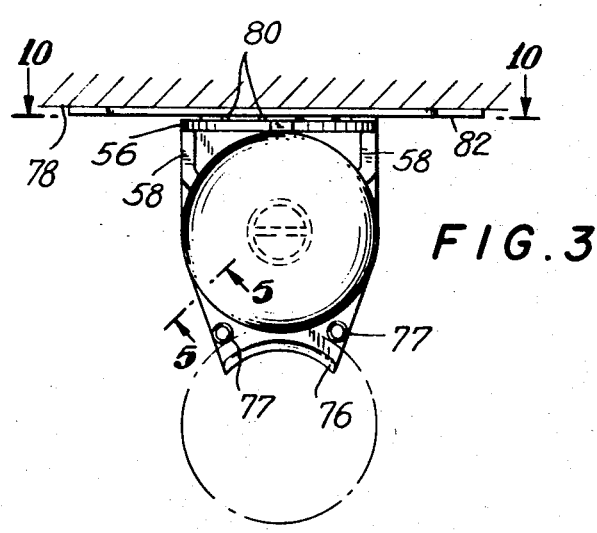
FIG. 3 is a top view of the storage container and bracket, and showing, in dot-and-dash lines, the position of the container cap as it is held by the bracket when not in use.

When a nurse who is using the thermometer storage container is about to take a patient's temperature she will remove the cylindrical housing from the bracket. This is done by grasping the container and sliding it upwardly until the ribs 62 no longer engage the tips of the opposed flanges 58. The cylindrical container is now free of the bracket 54 and may be grasped in the hand. The cap 20 is then unscrewed from the housing 12 and placed in a conveniently located holder 74 on the base 68 as shown in FIG. 2. The holder 74 is formed integrally with the bracket 54 and consists of an upright arcuate segment 76 extending from the forward edge of base 68. The segment 76 is convexly rearwardly contoured as illustrated in FIG. 3 with a radius of curvature slightly less than that of the internal cap radius. Its height is less than the height of the cap 20 so that the cap 20 may be received over the segment and its lower edge seated on the base 68. Two posts 77 project upwardly from the base 68 and are spaced from the segment a distance which is slightly greater than the thickness of the cap 20 so that the cap may be slipped over the segment 20 while exterior portions of the cap adjacent its lower end abut the posts 77.

To enable the cap 20 to be easily positioned and located on said segment 76, the segment tapers upwardly so that the maximum thickness is at the juncture of the segment and the base 68.

A further feature of the invention resides in the manner in which the bracket 54 is secured to a bedside wall so that an identification card may be conveniently supported between the bracket and the wall with a portion of the card projecting above the bracket as illustrated in FIG. 1.

Referring to FIGS. 2, 3 wherein the wall plate 56 of the bracket is secured to a bedside wall 78 and FIG. 10 wherein a portion of the rear surface of the wall plate is shown, a plurality of spaced vertically elongate teeth 80 of slight height are integrally formed on the rear surface of the wall plate 56. The teeth 80 extend outwardly from the wall plate toward the wall 78 and aid to hold in place an identification card 82 on which is written pertinent information. To attach the wall plate 56 to the wall, one face of a strip 84 of double faced adhesive is secured to the rear face of the wall plate. When the wall plate is pressed against the wall 78, the opposite face of the double faced adhesive grips the wall 78, tenaciously supporting the bracket 54 on the wall.

The strip 84 is located on the wall plate 56 below the teeth 80 with its upper edge preferably horizontal and slightly below the lower ends of said teeth so that it may serve as a stop for the card 82.

The teeth 80 project a distance rearwardly from the wall plate 56 which is less than the thickness of the strip 84 so that a space remains between the wall 78 and the tips of the teeth. This space is barely less than or about equal to the thickness of a card 82 which is subsequently slid downwardly between the wall plate and the wall and is held firmly against the wall by the teeth 80.

Thus, the card 82 if first prepared with the patient's name, room number and other desirable identifying information and then inserted behind the wall bracket 54. To insert the card 82, it is placed against the wall 78 between the upper edge of the wall plate 56 and the wall and then slid downwardly whereupon the teeth 72 engage and firmly hold the card against the wall as its lower edge abuts the upper edge of the strip 84.

Propylene glycol is used as a cold-sterilizing solution 86 which substantially fills the housing 12. This liquid medium is highly effective in sterilizing clinical thermometers, for instance it is highly effective against the commonly found intestinal organism Escherichia Coli AM-type culture 0119B14, one of the more resistant organisms that is a contaminate if external to the body, and against staphylococcus pyrogenes aureous American culture 209, and additionally has proved to be a very effective lubricant which facilitates the insertion of a clinical thermometer into the rectum.

Propylene glycol possesses fungicidal and bacteriocidal properties which are equal to that of the commonly used hospital cold sterilizing solutions such as: 1/5000 and 1/750 benzalkonium chloride water solution, ethyl alcohol, and a hydroalcholic solution of volatile oils.

In addition to its germicidal properties propylene glycol uniquely possesses a lubricating characteristic which may be called "lubricity". With the term "lubricity" serving as a measure of lubricating effectiveness for rectal insertion, the lubricity of propylene glycol is approximately that of glycerine. While the measure of lubricity of propylene glycol is not quite as high as that of the commonly used thermometer lubricants such as surgical jelly or petrolatum, it has been found to possess a sufficient degree of lubricity to facilitate easy insertion of the thermometer into a rectum.

Propylene glycol, U. S. P. in undiluted state is the preferred sterilizing medium. It can be effectively diluted with up to 50 percent of liquid diluent. Among the preferable liquid diluents are distilled water and ethyl alcohol. The resulting solutions have been found to have germicidal properties effectively as good as undiluted propylene glycol. Additionally, dilution with the above diluents does not decrease the lubricity, as compared to the undiluted propylene glycol, to a point where it no longer is effective as a lubricant for rectal insertion.

Additionally, oral thermometers may be effectively sterilized in propylene glycol as any residual propylene glycol coating on the thermometer is palatable.

Thus it will be seen that there are provided clinical thermometer storage and sterilizing apparatuses and a method which achieve the various objects of the invention and which are well adapted to meet the conditions of practical use.

As various possible embodiments might be made of the present invention and as various changes might be made in the embodiments above set forth, it is to be understood that all matter herein described or shown in the accompanying drawings is to be interpreted as illustrative and not in a limiting sense.

I claim:

1. A container for use in the storage and sterilizing of clinical thermometers, said container comprising a cylindrical housing, a supporting bracket, means for mounting said bracket on a bedside wall, a plurality of vertically extending spaced bracket-engaging means positioned around the periphery of said housing, said bracket-engaging means extending parallel to the longitudinal axis of the housing and being uniformly mutually circumferentially spaced around the exterior surface of the housing, said supporting bracket having a pair of spaced flanges, each of said flanges detachably engaging a different one of said bracket-engaging means, said housing having an open top, a diaphragm positioned over said open top, said diaphragm having a central opening of a size sufficient to allow the passage of a clinical thermometer therethrough, a cap positioned over said diaphragm in threaded engagement with said housing, the upper portion of said cap being spaced from said central opening, an inverted well projecting from the upper portion of said cap to the upper surface of said diaphragm and surrounding said central opening, the mouth of said well contacting said diaphragm and presenting a seal between said central opening and the remainder of the upper surface of said diaphragm.

2. A container for use in the storage and sterilizing of clinical thermometers, said container comprising a cylindrical housing, a supporting bracket, means for mounting said bracket on a bedside wall, a plurality of vertically extending spaced bracket-engaging means positioned around the periphery of said housing, said bracket-engaging means extending parallel to the longitudinal axis of the housing and being uniformly mutually circumferentially spaced around the exterior surface of the housing, said supporting bracket having a pair of spaced flanges, each of said flanges detachably engaging a different one of said bracket-engaging means, said housing having an open top, a diaphragm positioned over said open top, said diaphragm having a central opening of a size sufficient to allow the passage of a clinical thermometer therethrough, the diaphragm having an annular depending skirt terminating at a lower annular knife edge, a mating knife edge on the interior wall of said housing, said knife edges being in mutual engagement and presenting a liquidtight seal between the lower surface of said diaphragm and the interior of said housing.

3. A container for use in the storage and sterilizing of clinical thermometers, said container comprising a cylindrical housing, a supporting bracket, means for mounting said bracket on a bedside wall, a plurality of vertically extending spaced bracket-engaging means positioned around the periphery of said housing, said bracket-engaging means extending parallel to the longitudinal axis of the housing and being uniformly mutually circumferentially spaced around the exterior surface of the housing, said supporting bracket having a pair of spaced flanges, each of said flanges detachably engaging a different one of said bracket-engaging means, said housing having an open top, a diaphragm positioned over said open top, said diaphragm having a central opening of a size sufficient to allow the passage of a clinical thermometer therethrough, a plurality of teeth projecting from the rear of said bracket adjacent an edge thereof, said means for mounting said bracket to a bedside wall including a double faced adhesive strip, said strip adhering to the rear of said bracket and being spaced from said edge, said teeth extending from the rear of said bracket a distance less than the thickness of said strip, and an identification card wedged between the tips of said teeth and said bedside wall.

4. A thermometer storage and sterilizing container comprising a housing, said housing including an open top, a diaphragm positioned over said open top, said diaphragm having a central opening of a size sufficient to allow the passage of a clinical thermometer therethrough, a cap positioned over said diaphragm in twist-type detachable engagement with said housing, the upper portion of said cap being spaced from said central opening, an inverted well projecting from the upper portion of said cap to the upper surface of said diaphragm and surrounding said central opening, the mouth of said well contacting said diaphragm and presenting a seal between said opening and the remainder of the upper surface of said diaphragm.

5. The thermometer storage and sterilizing container of claim 4 wherein the diaphragm has an annular depending skirt terminating at a lower annular knife edge, a mating annular knife edge on the interior wall of said housing, said knife edges being in mutual engagement and presenting a liquidtight seal between the lower surface of said diaphragm and the interior of said housing.

6. The thermometer storage and sterilizing container of claim 4 wherein said diaphragm is dish-shaped, further including cold-sterilizing solution within said housing beneath said diaphragm, a thermometer positioned within said housing, a portion of said thermometer projecting through said central opening and into said inverted well, said thermometer portion projecting into said inverted well leaving a clear volume within said well, the volume capacity of said dish-shaped diaphragm being greater than said clear volume so that after the housing is inverted and the clear volume is filled with sterilizing solution the sterilizing solution escaping from the well when the cap is removed upon reinversion of the housing will not spill from the dish-shaped diaphragm.

7. A thermometer storage container comprising a housing, a supporting bracket, said housing being detachably connected to said bracket, a strip adhesively securing said bracket to a supporting wall, said bracket being spaced from said wall by said adhesive strip, and a plurality of teeth projecting from said bracket toward said supporting wall a distance less than the thickness of said adhesive strip, said teeth being located adjacent an edge of the bracket, the tips of said teeth being spaced from said wall a distance sufficient to allow the wedging of an identification card between said wall and said teeth.

8. A thermometer storage and sterilizing container comprising a housing, said housing including a wall forming an open top, a diaphragm positioned over said open top, said diaphragm having a central opening of a size sufficient to allow the passage of a clinical thermometer therethrough, said diaphragm including a peripheral flange overlying portions of said housing wall, a cap positioned over said diaphragm in twist-type detachable engagement with said housing, a peripheral seal on the interior of said cap, said seal contacting said peripheral flange and precluding the passage of fluids between the upper surface of said diaphragm and the exterior of said housing.

9. A method of simultaneously sterilizing and lubricating a clinical thermometer by applying a coating of propylene glycol to said thermometer over at least the bulb and adjacent portions of the shank thereof prior to inserting it into an individual's rectum.

10. A method of determining a body temperature of an individual, said method comprising the insertion of a thermometer sterilized and lubricated in accordance with the method of claim 9, into an individual's rectum.